Figure 1:
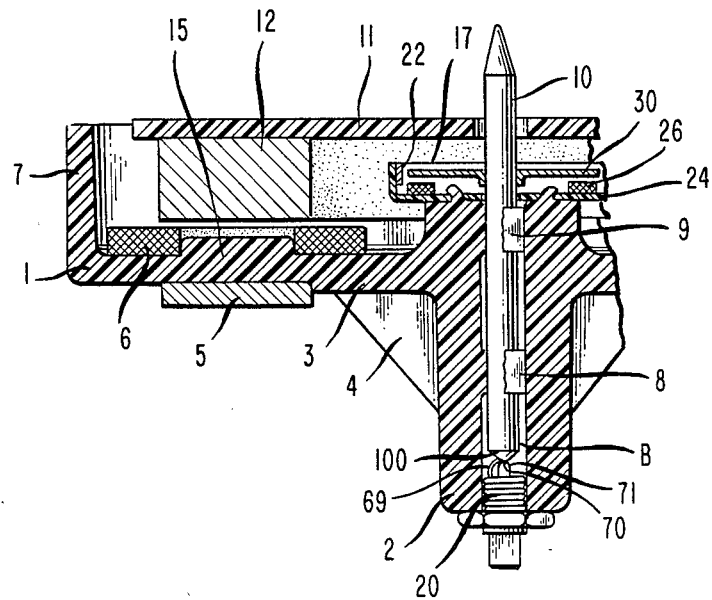

United States Patent [19]

Müller

[11] Patent Number: 4,884,000
[45] Date of Patent: Nov. 28, 1989

[54] BRUSHLESS DC MOTOR INNER TACHOMETER

[75] Inventor: Siegfried Müller, St. Georgen, Fed. Rep. of Germany

[73] Assignee: Papst Motoren KG, St. Georgen, Fed. Rep. of Germany

[21] Appl. No.: 179,577

[22] Filed: Apr. 8, 1988

Related U.S. Application Data

[63] Continuation of Ser. No. 816,299, Jan. 6, 1986, abandoned, which is a continuation-in-part of Ser. No. 111,991, Jan. 1, 1980, Pat. No. 4,357,550.

[30] Foreign Application Priority Data

Jan. 16, 1979 [CH] Switzerland .......................... 401/79

[51] Int. Cl.⁴ .......................................... H02K 11/00
[52] U.S. Cl. .................................. 310/268; 310/171; 310/43
[58] Field of Search ................... 310/43, 67 R, 68 R, 310/89, 268, 171, 91, 156, 42

[56] References Cited

U.S. PATENT DOCUMENTS

| 4,115,715 | 9/1978 | Müller | 310/67 R |
| 4,174,484 | 11/1979 | Schmider | 310/268 |
| 4,303,844 | 12/1981 | Suzuki | 310/268 |

FOREIGN PATENT DOCUMENTS 2748694 5/1979 Fed. Rep. of Germany .... 310/68 R

Primary Examiner—Patrick R. Salce
Assistant Examiner—D. L. Rebsch
Attorney, Agent, or Firm—Horst M. Kasper

[57] ABSTRACT

A collectorless DC motor with a horizontal air gap, particularly a low-speed motor for a direct drive of recording and/or reproducing devices has its rotor axle supported within an axial bore of the motor housing, with the motor housing made of plastic. A tachogenerator is disposed about the inner cylinder formed by the rotating permanent magnet ring of the motor. The stator winding and the magnetic return structure are fixedly arranged on the motor housing, which is also provided with bores for attaching the motor or installing it into the device. Obviating of machining sequences, simplification of assembly and direct support of the rotor axle in the motor housing all contribute to a reduction in manufacturing cost.

23 Claims, 1 Drawing Sheet

BRUSHLESS DC MOTOR INNER TACHOMETER

CROSS-REFERENCE TO RELATED APPLICATIONS

This application is a continuation of Ser. No. 816,299, now abandoned, which is a continuation-in-part application of another application filed Jan. 1, 1980, and bearing Ser. No. 111,991, now U.S. Pat. No. 4,357,550. The entire disclosure of this latter application, including the drawings thereof, is hereby incorporated in this application as if fully set forth herein.

This invention relates to a collectorless D.C. motor with horizontal air gap, particularly a low-speed motor for the direct drive of signal-processing recording and-/or reproducing devices.

At present, motors of this type mainly have a coreless stator winding arranged in the air gap, with their field, preferably a rotatable field, acting upon a permanent magnet located between the parts of the magnetic return structure.

As per the DE Letters of Disclosure 21 43 752 and 24 24 290, and the U.S. Pat. No. 3845 339 and 4 125 792, such a motor has become known.

In these motor arrangements, the stator winding is centrally held from the inside in a carrier plate at the die cast motor housing. In the axial direction, the stator winding is located in the usual manner between a permanent magnet and the second magnetic return structure which also rotates with the rotor. Locating the stator winding on the motor housing, correctly locating in its spatial relation to the permanent magnet and the magnetic return structure, both require a high manufacturing expenditure caused by machining to a high precision for assembling and for the motor housing produced by die casting.

As per DE Letter of Disclosure 25 33 187, U.S. Ser. No. 708 092, a further motor of this type is known in which, except for its face side, the rotor is also surrounded by a die cast motor housing in which the rotor bearing as well is centrally located. The individual plate-shaped coils of the stator winding are attached with their outer rim to the motor housing and project in the direction of the motor axle within the horizontal air gap between permanent magnet and magnetic return structure. That design also has a tacho-generator, the gear disc of which is attached with further components to the motor shaft after assembly of the motor. A point bearing for axial support of the rotor shaft is arranged herein at the cover cap which also concomitantly shields the tacho-generator towards the outside against electrical and magnetic fields of interference. With this motor, too, several machining sequences of high precision, a multitude of assembly sequences and expensive components of high precision are required, all of these having an unfavorable influence on the manufacturing cost of such a motor.

DE Letter of Disclosure 27 18 482 and U.S. Pat. No. 4164 690 show a motor for driving a small compact blower. In this known motor, the magnetic return structure is not attached on the rotor but arranged below the stator winding on a base plate from plastic. A bearing tube to hold the bearing is arranged vertical to it on the base plate. The axial force acting from the permanent magnet onto the magnetic return structure rests against the ball bearing and holds rotor and stator together. In its assembly technique, this design is also more simple than motors of the letters of disclosure named afore, but considerably lower demands relative to smooth and synchronous running are put forward for the usually high-speed drive motor for a blower.

The invention is based upon the object of reducing the manufacturing cost by obviating machining sequences and simplifying assembly, with adequate quality (for motors of this type) in respect of smooth and synchronous running.

As per invention, this object is realized by the motor housing consisting of plastic, by providing an axial bore in the plastic of the motor housing and by rotatably supporting the rotor axle within the axial bore.

The advantage of the invention rests on the fact that expenditure for producing the motor can be considerably lowered because the known casting and injecting techniques may be used in production, the former delivering parts of very exact dimensions. This will also improve smooth and synchronous running.

Other advantages can, furthermore, be achieved: Magnetic return structures and the stator winding may, for instance, be fixedly arranged at the motor housing by attaching them, also together with other components, to the motor housing by bonding or by detenting or compression connections. Otherwise, such components may together be joined to the plastic by injection molding.

By arranging the rotor bearing as a bore in the plastic of the motor housing, the bearing may readily be given different shapes by using appropriately shaped steel mandrels in casting. Thus the bearing surfaces may be cylindrical, with three or more flats, thread-shaped or provided with axially interrupted bearing surfaces.

The bearing pressure can be varied by appropriately narrow bores since the plastic can, to a limited extent, elastically adapt itself to the rotor shaft. Thrust bearings may be constructed rigid or adjustable. It will be simple to store larger quantities of lubricants in the widenings of the bores, so that motors of longer life can also be produced.

If higher demands are to be put to the running properties of the bearings, a different plastic, for instance with particularly good running properties may be used in the supporting zone of the bore.

Contact elements for the dissipation of electrostatic charges of the rotor may be provided within the bore. Further advantageous embodiments, such as for instance those described in the patent claims, are, furthermore, possible.

An embodiment of the invention is depicted in the drawing and will be described more closely below. Shown in:

FIG. 1 truncated, a longitudinal section through a motor as per invention.

The rotor axle 10 is radially and axially supported in a bore (B) of the one-piece motor housing 1. The plate-like housing bottom 3 is mechanically reinforced by the webs 4 distributed around the circumference and supported by toward the stem 2. A magnetic return structure 5 of ferrite is arranged at the lower side of the housing bottom, and the stator winding 6 at the opposite side. The permanent magnet 12, connected with the rotor axle 10 over the disc 11, will in operation be put into motion by the field of the stator winding 6, with magnetic return structure 5 forming the requisite flux return path.

Strong axially directed magnetic forces between the permanent magnet 12 and the return structure 5 act in such a manner that the rotor axle 10 is attracted axially towards the bottom part of the bore (B) and will firmly rest with its spherical end 100, nearly point like, against the motor housing 1. Additional means for axially securing rotor and stator against falling apart are, therefore, not required.

The bore of the stem 2 is matched as to its diameter to the shaft diameter and provided with preferably defined bearing locations. This will prevent that bending of the rotor axle or of the bore in the stem 2 could encumber the rotor rotation by binding.

Shaping of the bearing locations 8, 9 is made during production by means of mandrels. Various solutions are possible herein, e.g. two bearing locations at an axial distance, with cylindrical bearing surfaces or such with two or multiple, internal-thread-like, axially or radially offset or interrupted bearing surfaces for supporting the rotor axle 10 in the motor housing 1. Every space within the bore not occupied by the rotor axle 10 will simultaneously serve as lubricant storage.

In another embodiment the bearing bore diameter at the bearing loci 8, 9 is of differing dimensions and will vary between the bearing loci either in steps or gradually, in order to allow better removal of the plastic component from the mold, the lower bearing location 8 having herein the smaller bearing diameter. The appurtenant rotor axle 10 is appropriately adapted in its dimensions in order to attain small bearing plays. With a running through cylindrical bore in the stem 2, the motor axle 10 is provided with its "own" bearing loci, wherein two cylindrical zones of a larger diameter and an axial distance to each other form the bearing loci.

To adapt the bore diameter to the rotor axle 10, a small narrowing of the bore by, e.g. wedge-shaped projections on the bearing surfaces is possible. These will be pressed at their tips in an outward direction by the rotor axle 10 whereby the rotor axle 10 is supported in the bore with a small bearing play. Using a mandrel with axial recesses, the bore will have projections in an axial direction, shaped for instance like a wedge, which form the bearing surface for the rotor axle 10 and which also may be slightly deformed by the rotor axle 10 in order to obtain small bearing plays.

Injection molding of the motor housing from two different materials is also possible with advantage. Herein, a material of higher mechanical stability, for instance glass-fiber reinforced plastic or a die-cast component, is used for the housing itself, whilst a plastic with good bearing properties is selected for the rotor support in the zone of the bore.

If needed, the bearing surfaces for supporting the rotor axle 10 in the bore of the motor housing 10 are not smooth as when injected, but slightly roughened in order to improve forming of an oil film by better wetting of the plastic between the rotor axle 10 and the bearing surfaces in the bore.

Apart from the above, it is also possible to insert a bearing bushing for the radial and, in given instances also, axial, support of the rotor axle 10. This is conceivable particularly for high-speed drives, since these require an improved supply of the bearing loci with lubricant and smaller bearing plays to reduce running noises.

The magnetic return structure 5 is preferably joined to the motor housing 1 in the manner as shown, i.e. as an external disc-shaped insert or integrated into the housing bottom 3, more or less enclosed by the plastic of the motor housing 1. It is also possible to construct the magnetic return structure 5 with a smaller inner and larger outer diameter and with a plurality of stamped-out recesses, preferably outside of the annular effective zone of the permanent magnet. During injection molding, the bores are permeated by plastic, and the magnetic return structure 5 will essentially increase the mechanical stability of the motor housing. Parts of the magnetic return structure 5 will herein project with connecting bores from the motor housing 1 above the rim 7 or provision is made in the zone of the housing bottom 3 for threads serving for installing the motor in the device. The magnetic return structure is of one piece, but may also be constructed of a plurality of pieces, or it may have variations in its cross-section, spaced corresponding to the pole spacing, in order to obtain a momentum of reluctance in the direction of rotation.

The stator winding 6 is a formed spool and fixed in space by appropriately constructed projections or recesses 15 of the motor housing 1. Attachment of the stator winding 6 is accomplished by bonding, by thermoplastic deformation of the material of the motor housing, and it is also conceivable to fix the stator winding in the motor housing 1 by injection molding. Attachment by bonding or thermoplastic deformation is also possible for the magnetic return structure 5. Special measures for insulating the stator winding may be foregone since the motor housing is made from plastic.

Spatial fixing and locating of other motor components, e.g. a Hall generator or parts of the tacho-generator by the method as described afore is also possible. These parts or components of the control circuit may, herein, be arranged on a printed circuit.

As far as electrostatic charges of the rotor are to be avoided, a springing contact element 70 is provided in the stem 2, which has a contact with the rotor axle 10 in the zone of the axial bearing location 100 and which will safely dissipate the charges to the ground over a conducting connection.

In order to keep the frictional load upon the contact to a low level, the point of contact is located near to the approximately point like support of the convex curved face side 100 of the rotor axle 10.

The braking momentum exerted by the contact elements upon the rotor axle 10 can thus be appropriately minimized, even if the contact is touching the rotor axle 10 by two contact arms 69 and symmetrically, the point-like support point in the motor housing.

Use of plastic for the motor housing 1, dispensing with machining sequences on the stator, and attaching, or inserting respectively, of the magnetic return structure 5, the stator winding 6 and the stationary elements of the tacho-generator 17 to the motor housing 1, al at low cost, and the simple assembly of the motor by merely having to join stator and rotor, will jointly and severally reduce the production cost for this motor.

The tachogenerator 17 shown in FIG. 1 comprises a cogwheel 30 made from soft magnetic material attached to shaft 10. The cogwheel 30 can have from about 50 to 200 teeth around its periphery. A permanent magnet cylinder 22 is preferably adhesively attached to a shell 24 of soft magnetic material surrounding the tachogenerator 17 within an about inner cylinder configuration. The permanent magnet cylinder has twice the number of poles relative to the number of teeth of the cogwheel 30. The magnet cylinder 22 is preferably constituted by a plastic-bound permanent magnet strip, the length of which corresponds to the interior circumference of said cylinder 22. A ring coil 26 is attached to the base of the shell 24 and disposed such as to engage the changing magnetic fields caused by the rotation of the cogwheel 30. The voltage induced in the ring coil depends of the number of teeth of the cogwheel and of the rotation speed of the motor and can be employed for controlling the motor speed.

The tachogenerator is disposed about the inner cylinder formed by the rotating permanent magnet ring 12 of the motor. Preferably the tachogenerator 17 is disposed within the inner cylinder formed by the rotating permanent magnet ring 12 of the motor and more preferably is disposed about the middle of said cylinder. The disposition of the tachogenerator as shown in FIG. 1 results in a very compact motor allows for materials savings and lowers production costs.

An embodiment of the rotor support in the stem 2 of the motor housing 1, as per the subordinated claims, or arrangement of the speed indicator within the space between the magnetic return structure 11 and the inner diameter of the permanent magnet 12, is of advantage not only for motors as per this general category, but also, in principle, for all electric motors.

The magnetic return structure (5) can have threaded bores or lobes with bores for attaching the motor and can be located to the outside of the housing rim (1). The magnetic return structure (5) can have variations in its cross-section circumferentially spaced in the direction of rotation, which serve for the generation of a momentum of reluctance. The motor housing (1) can be provided for the purpose of attaching the motor with bores or with ribs outside of the housing rim (1) having bores. The bore (B) can have two bearing locations (8, 9) these being cylindrical or with three or more surfaces, or in the manner of an internal thread, or with an axially interrupted surface. The bearing surface in the bore (B) which serves to receive the rotor axle (10) can be formed by a helical rib or by multiple projections having flats and arranged at axial and circumferential offsets. The inner diameter of the bearing location (8) can be smaller than that of the bearing location (9).

The rotor axle (10) can be of a diameter, in the zone of the bearing locations (8,9), which matches the inner diameter of the bearing locations (8, 9). The bottom of the bore (B) can have a preferably adjustable thrust bearing 20 for the rotor axle (10). A bearing bushing in the bore (B) of the motor housing (1) can serve for the radial or axial support of the rotor axle (10). Lubricating agents can be stored in loci where the bore (B) is widened. The housing bottom (3) can have webs (4) axially distributed along the circumference. The tachogenerator (17) can be arranged above the bore (B) at the motor housing (1), and by the stator parts of the tachogenerator being fixed by projections and/or recesses of the motor housing (1) and attached to the motor housing (1) by bonding or thermoplastic deformation of the material of the housing. A contact element (70) for the dissipation of electrostatic charges of the rotor can be provided in the zone of the axial bearing location of the rotor axle (10).

The rotor axle (10) can be supported within the bearing (B) on preferably wedge-shaped projections. The inner diameter of the bore (B) can be partially smaller than the outer diameter of the rotor axle (10) at the loci of the projections, and by the deformations of the projections keeping the bearing play between the bore (B) and motor axle (10) as small as possible. The motor housing can consist up to the zone of the rotor suspension of a material of higher mechanical stability, which in the zone of the rotor suspension, is a plastic with good running properties. The bearing surfaces within the bore (B) can be slightly roughened. The end of the rotor shaft (10), which rests against the contact element (70) can have a face side (100) with a convex structure. The contact element (70) can be located at the locus of the face side (100) of the rotor shaft (10) which is near o its axis. The contact element (70) can have a contact arm (69) extending to the rotor shaft (10) and being under a spring-like contact pressure.

A basic idea of the invention (vide claims 1 to 4) may also be applied to motors with a rotating magnetic return structure (as for example described in detail in the German Letters of Disclosure No. 21 43 752 and 25 33 178, U.S. Pat. No. 3,845,339; Ser. No. 708,092).

It is also readily possible to make the thrust bearing of the motor adjustable, for instance by a screw 20, so that, respectively, the air gap or the elevation of the end of the rotor shaft 10 may easily be optimized.

I claim:

1. Brushless D.C. motor with axial air gap comprising
    a rotating permanent magnet ring of the motor defining an inner cylindrical space;
    a tachogenerator for controlling the speed of the motor disposed about the inner cylinder formed by the rotating permanent magnet ring of the motor and wherein the tachogenerator is disposed within the inner cylindrical space defined by the rotating permanent magnet ring of the motor;
    wherein the tachogenerator is disposed about the middle of the axial length of the inner cylindrical space formed by the rotating permanent magnet ring of the motor.

2. Brushless D.C. motor with axial air gap as per claim 1 wherein the magnetic return structure (5) is a part disposed outside an injection molded motor housing.

3. Brushless D.C. motor with a planar gap comprising
    a rotor with a rotating inner permanent magnet defining an inner cylindrical space;
    a stator winding producing a field which is acting upon said rotating inner permanent magnet to rotate the rotor for a low speed motor for the direct drive of read/write signal processing devices; and
    a tachogenerator for controlling the speed of the motor disposed within the inner cylindrical space defined by the inner surface of said rotating permanent magnet of the motor and which space is being limited by a magnetic disc-shaped return structure;
    wherein the tachogenerator is disposed about the middle of the axial length of the inner cylindrical space formed by the rotating permanent magnet ring of the motor.

4. Brushless D.C. motor with a planar air gap comprising
    a rotor with a permanent magnet ring;
    a stator winding producing an electromagnetic field adapted for interacting with said permanent magnet to rotate the rotor;
    a tachogenerator for controlling the speed of the motor disposed within an inner cylindrical space defined by the inner surface of said rotating permanent magnet of the motor and which space is being limited by a magnetic disc-shaped return structure;
    wherein the tachogenerator is disposed about the middle of the axial length of the inner cylindrical space formed by the rotating permanent magnet ring of the motor.

5. Brushless D.C. motor with a planar air gap according to claim 4 wherein the stator winding forms part of a low speed motor for the direct drive of read/write signal processing devices.

6. Brushless D.C. motor with a planar air gap according to claim 5 wherein the stator winding is a coreless stator winding, which is arranged in the air gap of the motor.

7. Brushless D.C. motor with a planar air gap according to claim 6 further comprising
a rotating magnetic return structure.

8. Brushless D.C. motor with a planar air gap according to claim 7 further comprising
a part of a magnetic return structure fixed on the stator.

9. Brushless D.C. motor with a planar air gap according to claim 7 further comprising
a motor housing; and
a part of a magnetic return structure fixed at the motor housing.

10. Brushless D.C. motor with a planar air gap according to claim 7 further comprising
a motor axle;
a connection disk connected to the motor axle and forming a magnetic return structure of the motor;
a permanent magnet connected to the connection disk.

11. Brushless D.C. motor with axial air gap comprising
a motor housing (1) having a bore (B);
a rotating permanent magnet ring of a motor defining an inner cylindrical space;
a tachogenerator for controlling the speed of the motor disposed within the inner cylindrical space defined by the rotating permanent magnet ring of the motor and wherein the tachogenerator (17) is arranged above the bore (B) at the motor housing (1), and where the tachogenerator (17) includes stator parts and where the stator parts of the tachogenerator are fixed by projections of the motor housing (1) and attached at the motor housing (1) by bonding or thermoplastic deformation of the material of the housing.

12. Brushless D.C. motor with axial air gap as per claim 11 wherein the tachogenerator is disposed about the middle of the inner cylindrical space defined by the rotating permanent magnet ring of the motor.

13. Brushless D.C. motor with axial air gap as per claim 11 wherein the motor housing (1) consists of plastic, and the axial bore (B) is provided in the plastic of the motor housing, and wherein the rotor axle (10) is rotatably supported at the axial bore (B).

14. Brushless D.C. motor with axial air gap as per claim 13 wherein a magnetic return structure (5) and the stator winding (6) are being fixedly attached to the motor housing (1).

15. Brushless D.C. motor with axial air gap as per claim 14 wherein the magnetic return structure (5), the stator winding (6) and/or other motor components are parts to be inserted when producing the motor housing by injection molding.

16. Brushless D.C. motor with axial air gap as per claim 13 wherein a magnetic return structure (5), the stator winding (6) as well as further components such as components of a printed circuit board are being bonded onto the motor housing (1), or being connected to it by thermoplastic deformation of the motor housing by means of detenting or compression connections.

17. Brushless D.C. motor with axial air gap as per claim 13 wherein projections (15) or recesses in the motor housing (1) serve for fixing the motor components in their places.

18. Brushless D.C. motor with axial air gap as per claim 13 wherein the magnetic return structure (5) extends beyond the effective range of the motor magnet and is provided there with cutouts to allow anchoring it with the plastic of the motor housing (1).

19. Brushless D.C. motor with axial air gap as per claim 18 where the magnetic return structure (5) extends up to the stem (2) of the motor housing (1) or, respectively, extends into it.

20. Brushless D.C. motor with axial air gap as per claim 11 wherein the tachogenerator is disposed within the inner cylinder formed by the rotating permanent magnet ring of the motor.

21. Brushless D.C. motor with axial air gap as per claim 11 wherein the stator winding (6) is a part inserted into an injection molded motor housing.

22. Brushless D.C. motor with axial air gap as per claim 11 wherein a motor component is inserted into an injection molded motor housing.

23. Brushless D.C. motor with axial air gap as per claim 13 wherein a magnetic return structure (5), the stator winding (6) as well as further components such as components of a printed circuit board are connected to the motor housing (1) by thermoplastic deformation of the motor housing by means of detenting or compression connections.

* * * * *